United States Patent [19]

Kagawa et al.

[11] Patent Number: 4,945,127

[45] Date of Patent: Jul. 31, 1990

[54] POLYMER COMPOSITION, ITS HEAT-RESISTANT, SHAPE MEMORY FORMED PRODUCT AND METHOD OF PRODUCING SAME

[75] Inventors: Seiji Kagawa; Hideaki Toda; Shinichiro Nomura, all of Yokohama, Japan

[73] Assignee: Tonen Sekiyukagaku Kabushiki Kaisha, Tokyo, Japan

[21] Appl. No.: 289,100

[22] Filed: Dec. 23, 1988

[30] Foreign Application Priority Data

Dec. 28, 1987 [JP] Japan ................... 62-333890
Mar. 10, 1988 [JP] Japan ................... 63-56695
Jun. 17, 1988 [JP] Japan ................... 63-149739

[51] Int. Cl.$^5$ ............... C08L 31/04; C08L 23/16
[52] U.S. Cl. ............... 524/524; 525/222; 525/197; 525/198; 525/211; 521/140
[58] Field of Search ............... 525/222, 198; 524/524; 521/140

[56] References Cited

U.S. PATENT DOCUMENTS

| | | |
|---|---|---|
| 3,361,852 | 1/1968 | Bassett et al. ............... 525/222 |
| 4,000,140 | 12/1976 | Tierney ............... 524/524 |
| 4,032,600 | 6/1977 | MacAdams et al. ............... 525/211 |
| 4,243,576 | 1/1981 | Fisher et al. ............... 525/222 |
| 4,302,557 | 11/1981 | Yoshimura et al. ............... 525/222 |
| 4,303,571 | 12/1981 | Jansen et al. ............... 524/524 |
| 4,332,655 | 6/1982 | Berejka ............... 525/222 |
| 4,379,190 | 4/1983 | Schenck ............... 525/222 |
| 4,639,487 | 1/1987 | Hazelton et al. ............... 524/524 |
| 4,713,419 | 12/1987 | Takimoto et al. ............... 525/222 |

FOREIGN PATENT DOCUMENTS

| | | | |
|---|---|---|---|
| 842902 | 5/1970 | Canada ............... | 521/140 |
| 158422 | 10/1985 | European Pat. Off. ............... | 524/524 |
| 54-155269 | 12/1979 | Japan . | |
| 59-53528 | 3/1984 | Japan . | |
| 59-50172 | 12/1984 | Japan . | |
| 60-28433 | 2/1985 | Japan . | |
| 62-86025 | 4/1987 | Japan . | |
| 62-22772 | 5/1987 | Japan . | |
| 1126857 | 9/1968 | United Kingdom ............... | 521/140 |

*Primary Examiner*—Carman J. Seccuro
*Attorney, Agent, or Firm*—Armstrong, Nikaido, Marmelstein, Kubovcik & Murray

[57] ABSTRACT

A heat-resistant formed product produced from a polymer composition comprising 40–70 weight % of a thermoplastic elastomer containing a repeating unit derived from ethylene and a repeating unit derived from propylene and 60–30 weight % of an ethylene-vinyl acetate copolymer containing 7.5 weight % or more of a vinyl acetate repeating unit, by blending the polymer composition at a temperature of 160° C. or less, molding it at a temperature of 180° C. or less, and then cross-linking the resulting molded product by irradiating electron beam or heating. The formed product also has good shape memory characteristics.

7 Claims, 3 Drawing Sheets

POLYMER COMPOSITION, ITS HEAT-RESISTANT, SHAPE MEMORY FORMED PRODUCT AND METHOD OF PRODUCING SAME

BACKGROUND OF THE INVENTION

The present invention relates to a polymer composition based on a thermoplastic elastomer and an ethylene-vinyl acetate copolymer, and more particularly to a polymer composition having good heat resistance and shape memory characteristics. It further relates to a formed product made of such a polymer composition and a method of producing such a formed product with good heat resistance and shape memory characteristics.

An ethylene-propylene copolymer, an ethylene-propylene-diene copolymer, etc. are elastomers which are widely used as rubber materials. However, since these elastomers have relatively poor heat resistance, they are usually cross-linked after having been formed into desired shapes.

In this case, they are sometimes blended with cross-linkable polymer components such as an ethylene-vinyl acetate copolymer and then cross-linked by heating. However, since such cross-linkable polymers are usually mixed with the elastomers at high temperature, such as 200° C. or more, this may cause a cross-linking reaction to initiate before the composition is formed into its desired shapes. This in turn makes it difficult to mold or form the resulting blends to desired shapes. In other words, such elastomer blends have poor moldability and formability. Accordingly, a polymer composition, having not only high heat resistance but also good moldability and formability, cannot be obtained.

For instance, Japanese Patent Publication No. 59-50172 discloses a resin composition comprising (a) a copolymer such as an ethylene-vinyl acetate copolymer, (b) an ethylene-α-olefin random copolymer and (c) a polymer such as crystalline polypropylene in proper proportions, which is cross-linked to have a boiling xylene-insoluble gel percentage and a melt index kept at certain levels. The cross-linking is conducted by irradiation of with an electron beam. However, since this composition is blended at as high a temperature as 240° C., the component (a), such as an ethylene-vinyl acetate copolymer, cannot be added in a large amount. As a result, the resulting composition has only 0.1–60 weight % of a boiling xylene-insoluble gel percentage after cross-linking. Because of this low gel percentage, this composition becomes sticky when heated at a high temperature.

Further, Japanese Patent Publication No. 62-22772 discloses a high-orientation film made of (a) 93–30 weight % of at least one polyolefin selected from the group consisting of an ethylene-vinyl acetate copolymer, low-density polyethylene, high-density polyethylene, crystalline polypropylene and polybutene-1, and (b) 7–70 weight % of a thermoplastic elastomer made of an ethylene-α-olefin copolymer, which has a boiling xylene-insoluble gel percentage of 60 weight % or less, a melt index of 1.0 or less, a tensile rupture strength of 5 kg/mm$^2$ or more and a temperature, needed to produce a 20-% shrinkage ratio, of 85° C. or less. This film is produced by extruding a resin having the above composition through an annular die at 180°–280° C., solidifying it rapidly, cross-linking it by irradiation with a high-energy beam, and then stretching it. However, since the resin is blended and extruded at high temperatures, its cross-linking inevitably initiates during the steps of blending and extrusion. In addition, to enable the stretching of the film, the level of cross-linking by irradiation of high-energy beam must necessarily be low, resulting in a low boiling xylene-insoluble gel percentage.

Besides the heat resistance, it has been found that some types of elastomer compositions have shape memory characteristics, and various proposals have been made with respect to this property.

For instance, Japanese Patent Laid-Open No. 59-53528 discloses a shape memory norbornene polymer having a glass transition temperature of 10° C. or more and a number average molecular weight of 1,000,000 or more. This polymer is molded and then deformed at a temperature lower than the molding temperature, and then the deformation of the molded product is set by cooling at a temperature lower than the glass transition temperature. When it is heated at a temperature between the glass transition temperature and the molding temperature, the deformed product can be returned to the original shape.

Japanese Patent Laid-Open No. 60-28433 discloses a synthetic copolymer, such as a butadiene-methyl methacrylate styrene copolymer, having a glass transition temperature higher than room temperature. Its cross-linked product has excellent shape memory characteristics and good formability.

Further, Japanese Patent Laid-Open No. 62-86025 discloses that a vulcanized rubber of a polymer, or its blend, such as a polychloroprene rubber having a glass transition temperature of −10° C. or less, a melting point of 35°–90° C. and a crystallization degree of 10–50% has good shape memory characteristics and good rubber elasticity at room temperature.

However, any of the above conventional shape memory polymer compositions are not satisfactory because of any one of the following problems:

(a) When a norbornene polymer is used, its molecular weight is very large, leading to poor moldability and formability.

(b) Because of high crystallization temperature, the original shape cannot be regained without applying high temperature.

(c) Special conditions are needed for molding and forming.

OBJECT AND SUMMARY OF THE PRESENT INVENTION

An object of the present invention is to provide a shape memory polymer composition which can be formed into various shapes by usual molding methods applicable to general-purpose resins.

Another object of the present invention is to provide a shape memory polymer composition further having good heat resistance and good moldability and formability.

A further object of the present invention is to provide a formed product made of such polymer composition which is cross-linked after molding.

A still further object of the present invention is to provide a method of producing such a formed product.

A still further object of the present invention is to provide a shape memory formed product having good formability.

As a result of intense research with a view toward satisfying the above objects, it has been found that a polymer composition comprising a thermoplastic elastomer, such as an ethylene-propylene-diene copolymer, and an ethylene-vinyl acetate copolymer has not only good shape memory characteristics but also excellent moldability, formability and heat resistance. The present invention is based on this finding.

Thus, the polymer composition according to the present invention comprises 40–70 weight % of a thermoplastic elastomer having a repeating unit derived from ethylene and a repeating unit derived from propylene, and 60–30 weight % of an ethylene-vinyl acetate copolymer containing 7.5 weight % or more of a vinyl acetate repeating unit.

The heat-resistant formed product according to the present invention is made of a polymer composition comprising 40–70 weight % of a thermoplastic elastomer and 60–30 weight % of an ethylene-vinyl acetate copolymer containing 7.5 weight % or more of a vinyl acetate repeating unit, which is cross-linked by irradiation of electron beam or heating after molding.

The method of producing a heat-resistant formed product from such a polymer composition according to the present invention comprises the steps of blending the polymer composition at a temperature of 160° C. or less, molding it at a temperature of 180° C. or less, and then cross-linking the resulting molded product by irradiating electron beam or heating.

The shape memory formed product according to the present invention is made of a polymer composition comprising 40–70 weight % of a thermoplastic elastomer containing a repeating unit derived from ethylene and a repeating unit derived from propylene, and 60–30 weight % of an ethylene-vinyl acetate copolymer containing 7.5 weight % or more of a vinyl acetate repeating unit, which is molded, deformed while heating at such a temperature as to melt crystal phases therein, and then cooled while being kept in a deformed shape.

DETAILED DESCRIPTION OF THE INVENTION

Figure 1:
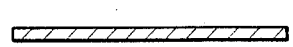
FIG. 1 is a cross-sectional view showing the shape of the formed product according to one embodiment of the present invention.

The thermoplastic elastomers containing repeating units derived from ethylene and repeating units derived from propylene may be an ethylene-propylene copolymer (EPR), an ethylene-propylene-diene copolymer (EPDM), etc.

The ethylene-propylene copolymer (EPR) used herein means a copolymer comprising 20–93 mol % of a repeating unit derived from ethylene and 7–80 mol % of a repeating unit derived from propylene. The repeating unit derived from ethylene is preferably 40–90 mol %, and further preferably 65–83 mol %, while the repeating unit derived from propylene is preferably 10–60 mol %, and further preferably 17–35 mol %.

The ethylene-propylene copolymer (EPR) preferably has a melt index of 0.8–20 g/10 minutes ( 190° C., 2.16 kg load], preferably 10–20 g/10 minutes.

The ethylene-propylene-diene copolymer (EPDM) means a copolymer comprising a repeating unit derived from ethylene, a repeating unit derived from propylene and a repeating unit derived from a diene compound. The diene compound which may be dicyclopentadiene, etc.

In the ethylene-propylene-diene copolymer (EPDM) used in the present invention, the content of the repeating unit derived from ethylene is generally 60–70 mol % and preferably 62–66 mol %, the content of the repeating unit derived from propylene is generally 30–40 mol % and preferably 33–37 mol %, and the content of the repeating unit derived from the diene compound is generally 1–10 mol % and preferably 3–6 mol %. The ethylene-propylene-diene copolymer ( EPDM) preferably has a number average molecular weight of 400,000–600,000.

The ethylene-propylene-diene copolymer (EPDM) generally has a density of 0.87 g/cm$^3$ or less.

Such ethylene-propylene diene copolymer (EPDM) preferably has a melt index of 0.1–5.0 g/10 minutes (190° C., 2.16 kg load), preferably 0.30–1.0 g/10 minutes and more preferably 0.35–0.50 g/10 minutes.

In the present invention, the ethylene-propylene copolymer (EPR) and the ethylene-propylene-diene copolymer (EPDM) may be used alone or in combination. Incidentally, when used in combination, a ratio of the ethylene-propylene copolymer (EPR) to the ethylene-propylene-diene copolymer (EPDM) is preferably in the range of 25:40–30:35.

The ethylene-propylene copolymer (EPR) and the ethylene-propylene-diene copolymer (EPDM) used in the present invention are essentially based on the above repeating units, but they may contain additional repeating units derived from α-olefins such as butene-1 or 4-methylpentene-1 in such proportions as not to deteriorate the properties of these copolymers.

The ethylene-vinyl acetate copolymer (EVA) used in the present invention means a copolymer containing 7.5 weight % or more of a vinyl acetate repeating unit. Particularly in the present invention, the content of the vinyl acetate repeating unit is preferably 7.5–30 weight %.

The ethylene-vinyl acetate copolymer (EVA) preferably has a number average molecular weight of 12,000–14,000, and a melt index of 15–20 g/10 minutes ( 190° C., 2.16 kg load].

The polymer composition of the present invention comprises 40–70 weight % of the thermoplastic elastomer containing the above repeating unit derived from ethylene and the repeating unit derived from propylene. The preferred content of the thermoplastic elastomer is 50–70 weight %, and the more preferred content is 55–65 weight %. When thermoplastic elastomer is less than 40 weight %, the resulting composition does not have high elasticity, and when it exceeds 70 weight %, the resulting composition does not have sufficient heat resistance. In addition, outside the range of 40–70 weight %, the resulting polymer composition does not have good shape memory characteristics.

The content of the ethylene-vinyl acetate copolymer (EVA) in the polymer composition of the present invention is generally 30–60 weight %, preferably 30–50 weight %, and more preferably 35–45 weight %. When the content of the ethylene-vinyl acetate copolymer (EVA) is less than 30 weight %, the resulting composition does not have good moldability and softness, and when it exceeds 60 weight %, the resulting composition becomes sticky, making more likely to cause blocking. In addition, outside the range of 30–60 weight %, the resulting polymer composition does not have good shape memory characteristics.

The shape memory characteristics of the polymer composition according to the present invention is particularly high when an ethylene-propylene-diene copolymer (EPDM) is used as the thermoplastic elastomer component. To achieve high shape memory characteristics, the content of ethylene propylene-diene copolymer (EPDM) is preferably 50–70 weight % based on the total amount of EPDM+EVA in the polymer composition. The particularly preferred content of EPDM is 55–65 weight %. When the ethylene-propylene-diene copolymer (EPDM) is lower than 50 weight %, the resulting composition does not have sufficiently high elasticity, and when it exceeds 70 weight %, the resulting composition does not have excellent moldability and formability as a shape memory resin. In this case, the content of the ethylene-vinyl acetate (EVA) is 50–30 weight % based on the total amount of EPDM+EVA in the polymer composition. It is preferably 45–35 weight %. When the content of the ethylene-vinyl acetate copolymer (EVA) is less than 30 weight %, the resulting composition does not have good moldability and softness, and when it exceeds 50 weight %, the resulting composition does not have sufficiently high heat resistance.

The polymer composition of the present invention may further contain a thermoplastic resin to improve its stiffness, moldability and formability. Particularly when the polymer composition is used as a shape memory resin, the addition of the thermoplastic resin is preferable to provide formed products such as cups, trays, etc.

The thermoplastic resins which may be used for this purpose are preferably polyolefins. Such polyolefins include homopolymers of α-olefins such as ethylene, propylene, butene-1, pentene-1, hexene-1, 4-methylpentene-1, etc.; copolymers of ethylene and propylene or other α-olefins: or copolymers of these α-olefins. Among them, various types of polyethylene, such as low-density polyethylene, linear low-density polyethylene, medium-density polyethylene and high-density polyethylene, and polypropylene are preferable. When polypropylene is used, it is not restricted to a homopolymer of propylene, and any random or block copolymers of propylene and other α-olefins, in which the propylene content is 50 mol % or more and preferably 80 mol % or more, may be used. As comonomers copolymerizable with propylene is ethylene and other α-olefins, and ethylene is particularly preferable. Accordingly, the term "polypropylene" used herein means that it is not restricted to a homopolymer of propylene but it includes any types of propylene copolymers.

The amount of the thermoplastic resin added is 20–70 parts by weight per 100 parts by weight of the thermoplastic elastomer+EVA+the thermoplastic resin. When it is less than 20 parts by weight, it does not serve to improve the stiffness and moldability of the polymer composition, and when it exceeds 70 parts by weight, the resulting polymer composition does not have sufficient shape memory characteristics.

The polymer composition of the present invention may further contain powdery fillers to improve its antiblocking characteristics and heat resistance. The powdery fillers include talc, titanium oxide, calcium carbonate, silica, silicone, etc. Such powdery fillers may be used alone or in combination. Particularly preferred as powdery fillers is talc.

The powdery fillers used in the present invention preferably have an average particle size of 0.1–10 μm.

The amount of the filler added to the polymer composition is 5–35 parts by weight per 100 parts by weight of the thermoplastic elastomer+EVA+the thermoplastic resin, if any +the filler. When it is less than 5 parts by weight, sufficient effects cannot be obtained. On the other hand, when it exceeds 35 parts by weight, the resulting composition rather has a decreased mechanical strength. Since the addition of the filler decreases the film-forming properties and stretchability of the resulting composition, the amount of the filler is determined, within the above range, depending on applications of the polymer composition.

For instance, when the polymer composition is used for heat-resistant films, the amount of the powdery filler is 5–15 parts by weight, and preferably 5–10 parts by weight. When it is lower than 5 parts by weight, remarkable effects cannot be obtained. On the other hand, when it exceeds 15 parts by weight, the heat-resistant films formed from the polymer composition do not have sufficient mechanical strength.

Further, depending upon applications, a foaming agent may be added. The foaming agent which may be used in the present invention is a compound which is in a liquid state or in a solid state at room temperature, but is decomposed or vaporized at a temperature higher than the melting points of the resin components. Unless it adversely affects the molding and the cross-linking reaction of the polymer composition, any foaming agent may be used. The amount of the foaming agent added is preferably 0.3–1.0 parts by weight per 100 parts by weight of the total amount of the polymer composition.

Incidentally, in the present invention, besides the above powdery filler, the thermoplastic resin and the foaming agent, fillers such as carbon black, antioxidants, colorants, etc. may be added in proper amounts.

The polymer composition of the present invention may be produced and formed into various shapes by a method described below.

First, the thermoplastic elastomer and the ethylene-vinyl acetate copolymer (EVA) are blended at a temperature of 160° C. or less. In the present invention, by blending the resin components at such a relatively low temperature, a cross-linking reaction can effectively be avoided in the step of blending, thereby preventing the resulting composition from having poor moldability and formability. The preferred blending temperature is 130–150° C., and further preferably it is lower than the molding temperature by at least 20° C., particularly at least 30° C.

To achieve sufficient blending at such a relatively low temperature, a cooling means should be mounted to a usual blending apparatus such as an extruder, a kneader, Banbury mixer, etc., to prevent the resin being blended in the apparatus from being heated excessively. However, if the resin is kept at such a blending temperature for a long period of time, a cross-linking reaction may take place. Accordingly, the blending time is preferably as short as 1–3 minutes at the above blending temperature.

After blending under the above conditions, the polymer composition is formed into a desired shape. In this case, the molding temperature is 180° C. or less. Such a low molding temperature is effective to prevent the thermal deterioration of the resin. Particularly in the present invention, the molding temperature is preferably 150–170° C.

Such molding at a low temperature can be conducted by using a full-flighted screw equipped with deep grooves for preventing heat generation.

The molded product may be used without further formation treatment, if it is in a final shape. However, when it is required to have various shapes, such as a tray, a cup, etc., an additional forming step is conducted. Particularly when the molded product is in a sheet shape, it can easily be formed into various shapes by a thermoforming machine. Incidentally, finally formed products will be called simply "formed products" herein, but it should be noted that the formed products do not exclude the above molded products.

The formed product is preferably subjected to a cross-linking reaction to improve its heat resistance and shape memory characteristics. Specifically, when the formed product is to be used as a shape memory formed product, the cross-linking is not necessarily indispensable. However, since the cross-linked formed product has excellent shape memory characteristics, the cross-linking reaction is preferable. And when the formed product is required to have good heat resistance, for instance, as a heat-resistant film, the cross-linking reaction is necessary.

The cross-linking reaction can be conducted by any conventional methods. However, in the present invention, a method of cross-linking by irradiation of electron beam or heating is preferable.

In the case of irradiating electron beam, the irradiation energy of the electron beam can be determined depending upon shapes and sizes of the formed product, but it is generally preferable to use electron beam having a wavelength of 30–40Å. The irradiation amount of electron beam is generally 5–40 Mrad.

By irradiating electron beam, a cross-linking structure is formed in the formed product, so that its heat resistance and shape memory characteristics are improved.

In the case of forming a cross-linking structure by heating, the formed product is heated at 75°–270° C., preferably at 100°–200° C. However, when this method is used, heat energy added to the formed product should be larger than the total thermal energy added during the blending and molding steps. In other words, by conducting blending and molding at low temperature, a cross-linking reaction is suppressed, and after molding an effective cross-linking reaction is caused by adding sufficient thermal energy to the molded product. Specifically, to cause a cross-linking reaction, the thermal energy is 300 cal per 1 g of the formed product under the above heating conditions. The preferred thermal energy is 300–500 cal/g.

By the above irradiation of electron beam or heating, the formed product is caused to contain 55 weight % or more, preferably 65 weight % or more of boiled xylene-insoluble gel components.

The formed product thus obtained has extremely good heat resistance, formability and shape memory characteristics.

The shape memory characteristics of the polymer composition of the present invention are considered to be based upon the following mechanism.

First, the polymer composition is melted and formed into a desired shape while applying a stress. The resulting formed product is heated to melt crystal phases in the formed product. The heating temperature is higher than the crystallization temperature of the formed product, at a higher temperature than which crystal phases do not exist, and lower than the molding temperature. In a state in which the crystal phases are melted in the formed product, namely in an amorphous state, a stress is applied to deform the formed product. By cooling it, the deformation is set, namely the solidified crystal phases keep the formed product in a deformed shape. It should be noted, however, that a network structure itself in the formed product is not changed by this deformation. In other words, the original shape of the formed product governed by the network structure is memorized.

By heating the formed product thus deformed, the crystal phases in the deformed product are melted again. As a result, a stress of keeping the formed product in a deformed shape becomes smaller than an internal stress based upon the network structure due to cross-linking, causing it to return to the original shape. A heating temperature for returning to the original shape is near the deformation temperature. However, because the stress is not required, even when the deformation is conducted at 150° C., heating at 100° C. or so can cause it to return to the original shape.

The present invention will be explained in further detail by the following Examples.

EXAMPLE 1

The following resin composition was blended at 160° C. by means of a double-screw extruder equipped with a T die, and a sheet of 1.4 mm in thickness was obtained through the T die.

| | |
|---|---|
| Ethylene-propylene-diene copolymer | 60 parts by weight |
| Ethylene-vinyl acetate copolymer | 40 parts by weight |

Incidentally, the above ethylene-propylene-diene copolymer ( EPDM]had a ratio of ethylene:propylene:-diene=62:33:5 by mole, and the diene component was ethylidene norbornene. This EPDM had a number average molecular weight of 500,000 and a melt index of 0.35 g/10 minutes.

The ethylene-vinyl acetate copolymer contained 28 weight % of a vinyl acetate repeating unit, and had a number average molecular weight of 14,000, and a melt index of 20 g/ 10 minutes.

Next, the resulting sheet was formed by a thermoforming machine to memorize its original shape as shown in FIG. 1. This heating condition was 180° C. and 30 seconds.

Figure 2:
FIG. 2 is an end view showing the shape of the formed product of FIG. 1 after deformation.

Next, the sheet product was deformed by a thermoforming machine to a shape as shown in FIG. 2. This deformation was conducted at 150° C. for 75 seconds. The deformation was set by cooling it at 25° C. for 30 seconds. The deformed product thus obtained had an inner diameter of 78 mm, a flange length of 5 mm, a depth of 30 mm and a thickness of 1.4 mm.

This deformed product was then immersed in a hot water at 90° C. about 1 minute. As a result, it regained the original shape as shown in FIG. 1.

EXAMPLE 2

A resin composition having a formulation as described below was blended by a double-screw extruder as in Example 1 to obtain resin composition pellets.

| | |
|---|---|
| Ethylene-propylene-diene copolymer | 55 parts by weight |
| Ethylene-vinyl acetate copolymer | 35 parts by weight |
| Silicone | 10 parts by weight |

Incidentally, the above ethylene-propylene-diene copolymer and ethylene-vinyl acetate copolymer were the same as in Example 1, and the silicone was Tospearl (manufactured by Toshiba Corporation, spherical having a particle size of 2 μm).

The resulting resin composition pellets were subjected to injection molding at 160° C. to memorize its shape. It was then cooled to room temperature and irradiated with electron beam of 25 Mrad (750 kV) to obtain the formed product of a cross section shown in FIG. 3. This formed product had an inner diameter of 135 mm, a flange length of 2 mm, a depth of 40 mm and a thickness of 2 mm.

Figure 4:
FIG. 4 is a cross-sectional view showing schematically the shape of the formed product of FIG. 3 after deformation.

This cross-linked product was deformed by pressing to to a shape as shown in FIG. 4. This deformed product was in a shape of a sheet of 1.5 mm in thickness. The deformation conditions were 100° C. and 5 minutes, and the deformation was set by cooling at 25° C. for 30 seconds.

Figure 3:
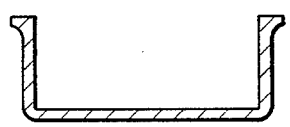
FIG. 3 is an end view showing the shape of the formed product according to another embodiment of the present invention.

Next, the deformed product was immersed in hot water at 90° C. for about 1 minute. As a result, it regained the original shape as shown in FIG. 3. Returning to the original shape took place three-dimensionally, and the original shape returned from the deformed product was completely the same as that shown in FIG. 3.

EXAMPLE 3

A resin composition having a formulation as shown below was blended by a double-screw extruder and formed into a sheet by a T die in the same manner as in Example 1.

| | |
|---|---|
| Ethylene-propylene-diene copolymer | 60 parts by weight |
| Ethylene-vinyl acetate copolymer | 40 parts by weight |
| Foaming agent | 1 part by weight |

Incidentally, the above ethylene-propylene-diene copolymer and the ethylene-vinyl acetate copolymer were the same as in Example 1, and the foaming agent was 5001 manufactured by Celltec.

The extrusion temperature was 150°–170° C., and the resulting sheet was foamed at 2.5 times.

The resulting foamed product was formed by a thermoforming machine at 100° C. for 3 minutes to memorize its shape, and cooled to room temperature. After that, it was subjected to irradiation of electron beam of 10 Mrad (750 kV). As a result, the foamed product in a shape shown in FIG. 5 was obtained. This foamed product had an outer diameter of 70 mm, a height of 50 mm and a thickness of 2.5 mm.

Figure 6:
FIG. 6 is a perspective view showing the formed product of FIG. 5 after deformation.

This foamed product was deformed by pressing to a shape as shown in FIG. 6. The deformed product was in a shape of a disc of 80 mm in diameter and 8 mm in thickness. Incidentally, deformation was conducted at 70° C. for 1 minute, and the deformation was set by cooling at 25° C. for 30 seconds.

Figure 5:
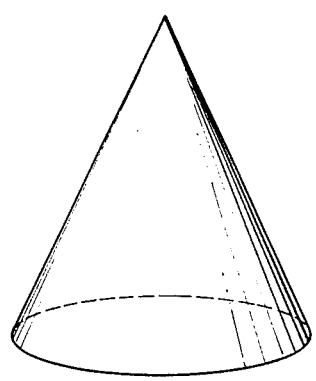
FIG. 5 is a perspective view showing the formed product according to a further embodiment of the present invention.

Next, the deformed product was immersed in hot water at 70° C. for 30 seconds. As a result, it regained its original shape as shown in FIG. 5. Returning to its original shape took place three-dimensionally, and the original shape returned from the deformed product was completely the same as in FIG. 5.

EXAMPLE 4

A resin composition having a formulation as shown below was blended by a double-screw extruder and formed into a sheet by a T die in the same manner as in Example 1.

| | |
|---|---|
| Ethylene-propylene-diene copolymer | 30 parts by weight |
| Ethylene-vinyl acetate copolymer | 20 parts by weight |
| Low-density polyethylene | 50 parts by weight |

Incidentally, the above ethylene-propylene-diene copolymer, the ethylene-vinyl acetate copolymer and the foaming agent were the same as in Example 3. and the low-density polyethylene had a MI of 4.7 and a density of 0.917.

The extrusion temperature was 150°–170° C., and the resulting sheet was foamed at 2.0 times.

Figure 7A:
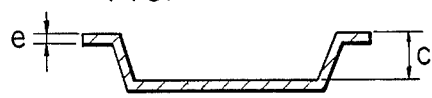
FIG. 7 shows the shape of the formed product according to a still further embodiment of the present invention, in which (A) is an end view and (B) is a plan view.
Figure 7B:
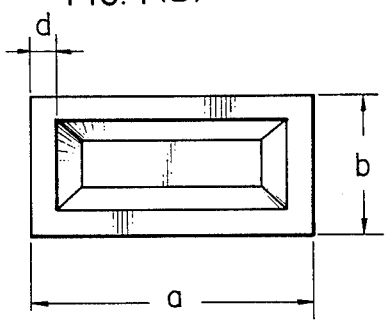

The resulting foamed product was formed by a thermoforming machine at 150° C. for 1 minute to memorize its shape, and cooled to room temperature for 15 seconds. After that, it was subjected to irradiation of electron beam of 20 Mrad ( 750 kV). The resulting foamed product as shown in FIGS. 7 (A) and (B) was in a shape of a tray having a longer side (a) of 200 mm, a shorter side (b) of 120 mm, a depth (c) of 20 mm, a flange length (d) of 20 mm and a thickness (e) of 1.5 mm.

Figure 8A:
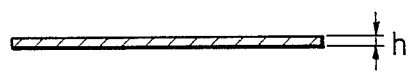
FIG. 8 schematically shows the shape of the formed product of FIG. 7 after deformation, in which (A) is a vertical cross-section and (B) is a plan view.
Figure 8B:
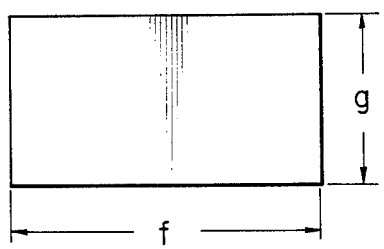

This foamed product was deformed by pressing to a shape as shown in FIGS. 8 (A) and (B). This deformed product was in a shape of a sheet having a longer side (f) of 250 mm, a shorter side (g) of 125 mm and a thickness (h) of 3 mm. Incidentally, the deformation conditions were 90° C. and 1 minute, and the deformation was set by cooling at 25° C. for 30 seconds.

Next, the deformed product was immersed in hot water at 80° C. for 30 seconds. As a result, it regained its original shape as shown in FIGS. 7 (A) and (B). Returning to the original shape took place three-dimensionally, and the returned shape was completely the same as shown in FIGS. 7 (A) and (B).

EXAMPLE 5

The following resin composition was blended at 160° C. by means of a double-screw extruder equipped with a T die, and a resin composition in the form of pellets was obtained.

| | |
|---|---|
| Ethylene-propylene-diene copolymer | 55 weight % |

| -continued | |
|---|---|
| Ethylene-vinyl acetate copolymer | 35 weight % |
| Talc | 10 weight % |

Incidentally, the above ethylene-propylene-diene copolymer (EPDM) had a ratio of ethylene:propylene:diene=62:33:5 by mole, and the diene component was ethylidene norbornene. This EPDM had a number average molecular weight of 500,000 and a melt index of 0.35 g/10 minutes.

The ethylene-vinyl acetate copolymer contained 28 weight % of a vinyl acetate repeating unit, and had a number average molecular weight of 14,000 and a melt index of 20 g/ 10 minutes.

The talc had an average particle size of 5 μm.

The resin composition thus obtained was formed into a uniform film having a thickness of 100 %m by an inflation method using a full-flight screw equipped with deep grooves. The forming temperature was 170° C.

Next, this film was irradiated with electron beam of 200 kV continuously. The irradiation amount of electron beam was 20 Mrad. By irradiating electron beam, a boiling xylene-insoluble gel component in the film became 85.6 weight The resulting film was measured with respect to rupture strength according to ASTM D882. As a result, the rupture strength was 123.5 kg/cm² in the machine direction (MD) and 41.5 kg/cm² in the transverse direction (TD). Its elongation measured according to ASTM D882 was 480% in the machine direction (MD) and 310% in the transverse direction (TD).

Figure 9:
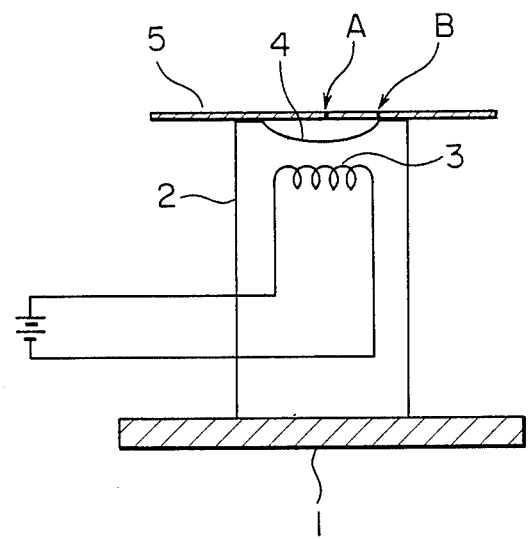
FIG. 9 is a cross-sectional view showing the apparatus for measuring the heat resistance of a film.

Next, the film was measured with respect to heat resistance by means of an apparatus shown in FIG. 9.

This apparatus for measuring heat resistance comprises a base 1 and a measurement part 2 mounted thereon, which contains a heater 3. Provided on an upper end of the measuring part 2 is a circular recess 4.

The heat resistance of the film 5 was measured by placing it on the top of the measuring apparatus 2, and heating it by the heater 3 to measure the thermal change of the film 5. Incidentally, the film 5 was heated such that a point A near a center of the recess 4 was at a temperature corresponding to the glass transition temperature of the film 5, and a point B near the periphery of the recess 4 was at a temperature corresponding to the melting point of the film. The temperatures at points A and B were measured from above by means of a radiation thermometer (not shown).

The heat resistance of each film is shown in Table 1 below.

EXAMPLE 6

Example 5 was repeated except for heating the film at 75° C. for 5 minutes instead of irradiating electron beam. This heat treatment gave a thermal energy of 300–500 cal/g to the film, which corresponded to about 10 times the thermal energy given by blending and forming.

By this heat treatment, a boiling xylene-insoluble gel component became 67.4 weight %.

The resulting film had the following rupture strength and elongation:

| Rupture strength | MD: 155 kg/cm² |
|---|---|
|  | TD: 100 kg/cm² |
| Elongation | MD: 680% |
|  | TD: 700% |

The heat resistance of the film is shown in Table 1 below.

COMPARATIVE EXAMPLE 1

Example 5 was repeated except for conducting no irradiation of electron beam. The resulting film contained no boiling xylene-insoluble gel component.

The film had the following rupture strength and elongation:

| Rupture strength | MD: 176 kg/cm² |
|---|---|
|  | TD: 117 kg/cm² |
| Elongation | MD: 700% |
|  | TD: 750% |

The heat resistance of the film is shown in Table 1 below.

COMPARATIVE EXAMPLE 2

High density polyethylene was used to form a film of 100 μm in thickness. This film contained no boiling xylene-insoluble gel component.

This film had the following rupture strength and elongation:

| Rupture strength | MD: 520 kg/cm² |
|---|---|
|  | TD: 480 kg/cm² |
| Elongation | MD: 570% |
|  | TD: 910% |

The heat resistance of the film is shown in Table 1 below.

TABLE 1

| Sample No. | Temperature at Point A | | | | |
|---|---|---|---|---|---|
|  | 150° C. | 200° C. | 250° C. | 300° C. | 350° C. |
| Example 5 | Kept for 60 sec No discoloration and no thermal deformation | Kept for 60 sec No discoloration and no thermal deformation | Kept for 60 sec No discoloration and no thermal deformation | Kept for 180 sec No discoloration and no thermal deformation | Discolored in 7 sec Melted at 350° C. |
| Example 6 | Kept for 60 sec No discoloration and no thermal deformation | Kept for 60 sec No discoloration and no thermal deformation | Kept for 60 sec No discoloration and no thermal deformation | Kept for 60 sec Melted after discoloration | — |
| Comparative Example 1 | Melted after discoloration in 1.5 sec | — | — | — | — |
| Comparative Example 2 | Melted after discoloration | — | — | — | — |

TABLE 1-continued

| Sample No. | Temperature at Point A | | | | |
|---|---|---|---|---|---|
| | 150° C. | 200° C. | 250° C. | 300° C. | 350° C. |
| | in 2.0 sec | | | | |

Since the polymer composition of the present invention is composed mainly of the thermoplastic elastomer and the ethylene-vinyl acetate copolymer, it has good moldability, heat resistance and formability. Accordingly, like other resins, it can be formed into thin films and also can be subjected to injection molding at a relatively low temperature. Thus, without deterioration, various shapes of formed products can be produced therefrom.

In addition, depending upon applications, it can be subjected to irradiation of electron beam or heating after molding to conduct its cross-linking. Thus, the formed product can have excellent heat resistance as well as shape memory characteristics.

Further, according to the method of the present invention, the thermoplastic elastomer and the ethylene-vinyl acetate copolymer are blended and molded at a relatively low temperature and then it is subjected to a cross-linking reaction. Therefore, the molding and the forming of the polymer composition is extremely easy, and the formed product can have extremely high heat resistance because of its cross-linked structure. Further, because of the relatively low temperature in the steps of blending and molding, there is no problem of thermal decomposition. Thus, the resulting formed product does not suffer from any deterioration of mechanical strength and elasticities. The formed product of the present invention has good softness as compared to those produced by the conventional methods.

In addition, the polymer composition of the present invention can have excellent shape memory characteristics when formed and deformed at proper temperatures. Therefore, they can be used in various applications such as housing materials, joints of pipes of different diameters, clothings such as brassiere cups, portable containers which are folded and returned to their desired shapes when used, etc.

Further, as heat-resistant materials, the polymer composition of the present invention may also be used for heat-resistant pipes, heat-resistant wrapping film materials, heat-resistant sealing film materials, etc.

What is claimed is:

1. A shape memory formed product made of a polymer composition comprising 40–70 weight % of a thermoplastic elastomer containing a repeating unit derived from ethylene and a repeating unit derived from propylene, and 60–30 weight % of an ethylene-vinyl acetate copolymer containing 7.5 weight % or more of a vinyl acetate repeating unit, wherein said polymer composition is prepared by blending at a temperature of 160° C. or less, then molded at a temperature of 180° C. or less to produce a formed product, then which is deformed at such a temperature that crystal phases wherein are melted and then cooled while being kept in a deformed shape so as to obtain a shape memory formed product.

2. The shape memory formed product according to claim 1, wherein said thermoplastic elastomer is an ethylene-propylene-diene copolymer.

3. The shape memory formed product according to claim 2, wherein said ethylene-propylene-diene copolymer is 50–70 weight %, and said ethylene-vinyl acetate copolymer is 50–30 weight %.

4. The shape memory formed product according to claim 1, further comprising 5–35 parts by weight of a filler per 100 parts by weight of said thermoplastic elastomer + said ethylene-vinyl acetate copolymer + said filler.

5. The shape memory formed produce according to claim 1, further comprising 20–70 parts by weight of a thermoplastic resin per 100 parts by weight of said thermoplastic elastomer + said ethylene-vinyl acetate copolymer + said thermoplastic resin.

6. The shape memory formed product according to claim 1, further comprising a foaming agent such that it is foamed when heated in the step of molding.

7. The shape memory formed product according to claim 1, wherein after the molding step the resulting molded product is cross-linked by electron beam irradiation or heating.

* * * * *